(12) United States Patent
Lederer et al.

(10) Patent No.: US 8,815,987 B2
(45) Date of Patent: Aug. 26, 2014

(54) POLYPROPYLENE MINERAL COMPOUND WITH REDUCED VOLATILES

(75) Inventors: Klaus Lederer, Linz (AT); Michael Otte, Kirchdorf/Krems (AT); Erwin Kastner, Linz (AT); Juliane Braun, Linz (AT); Wolfgang Stockreiter, Puchenau (AT)

(73) Assignee: Borealis AG, Vienna (AT)

( * ) Notice: Subject to any disclaimer, the term of this patent is extended or adjusted under 35 U.S.C. 154(b) by 235 days.

(21) Appl. No.: 13/379,490

(22) PCT Filed: Jun. 16, 2010

(86) PCT No.: PCT/EP2010/058431
§ 371 (c)(1),
(2), (4) Date: Jan. 25, 2012

(87) PCT Pub. No.: WO2010/149548
PCT Pub. Date: Dec. 29, 2010

(65) Prior Publication Data
US 2012/0123033 A1   May 17, 2012

(30) Foreign Application Priority Data

Jun. 22, 2009  (EP) ................................. 09163395

(51) Int. Cl.
*C08K 5/49* (2006.01)
*C08K 3/34* (2006.01)
*C08K 5/13* (2006.01)

(52) U.S. Cl.
CPC .... *C08K 3/34* (2013.01); *C08K 5/13* (2013.01)
USPC ............................................ 524/115; 524/442

(58) Field of Classification Search
USPC ............................................................. 524/115
See application file for complete search history.

(56) References Cited

U.S. PATENT DOCUMENTS

| 4,366,264 A | 12/1982 | Wawzonek |
| 6,660,797 B1 * | 12/2003 | Banno et al. .................. 524/505 |
| 2008/0045638 A1 * | 2/2008 | Chapman et al. ............. 524/425 |

FOREIGN PATENT DOCUMENTS

| CN | 101274476 A | 10/2008 |
| WO | WO 01/60917 A1 | 8/2001 |
| WO | WO 2004/063268 A1 | 7/2004 |

OTHER PUBLICATIONS

Quan, Zhou, et al., "Study and Application of Small Bulk Blending Modified PP", Advances Science & Technology 2001.

* cited by examiner

*Primary Examiner* — Hui Chin
(74) *Attorney, Agent, or Firm* — Tarolli, Sundheim, Covell & Tummino LLP

(57) ABSTRACT

Use of an inosilicate in a polymer composition to accomplish a headspace emission of all volatiles together of said polymer composition of equal or below 120 μgC/g.

19 Claims, No Drawings

POLYPROPYLENE MINERAL COMPOUND WITH REDUCED VOLATILES

RELATED APPLICATION

This application corres. to PCT/EP2010/058431filed Jun. 16, 2010, which claims priority from European Patent Application No. 09163395.8, filed Jun. 22, 2009, the subject matter of which are incorporated herein by reference in their entirety.

The present invention relates a new polypropylene composition comprising phenolic antioxidants and the use of inosilicate in polymer compositions.

Polypropylene is the material of choice for many applications. For instance polypropylene in combination with talc is used as back sheets of blister packaging as well as in articles in the automotive interior. Said polypropylene/talc compositions are—generally speaking—good processable and can be individually customized. However such materials must also provide long term stability against environmental impacts, like oxidative degradation, keeping the tailored properties of the polypropylene/talc composition on the desired level. Accordingly antioxidants are added to impair the degradation of the polypropylene/talc compositions. However the antioxidants themselves may be instable under specific environmental stresses, which might lead also to malodour. Over the last years the standard requirements for long term stability have been even steadily tightened, which in turn increased the amounts of additives to satisfy the ambitioned desires, like heat resistance and/or mechanical properties. On the other hand such an increasing amount of additives intensifies the risk of side reactions. Such side reactions, in particular in cases where degradation of antioxidants is involved, lead to side products being quite often volatile. Of course volatile compounds should be kept on low levels in particular as they are not accepted by the customers.

Thus the object of the present invention is to reduce the amount of volatile compounds, in particular of 2-methyl-1-propene, in polymer compositions comprising phenolic antioxidants. There is in particular the desire to reduce the amount of headspace emission according to VDA 277.

The first finding of the present invention is that the amount of volatile compounds is mainly based on the rather rapid degradation of phenolic antioxidants in the presence of talc. The second finding of the present invention is that the degradation of the antioxidants can be reduced by substituting talc.

Thus the present invention is directed the use of an inosilicate in a polymer composition to accomplish a headspace emission measured according to VDA 277
(a) of all volatiles together of said polymer composition of equal or below 120 µgC/g, preferably below 100 µgC/g, more preferably below 80 µgC/g. still more preferably below 60 µgC/g, like below 50 µgC/g and/or
(b) of 2-methyl-1-propene of said polymer composition of not more than 70 µgC/g, preferably below 20 µgC/g, more preferably below 10 µgC/g. still more preferably below 5 µgC/g, yet more preferably below 1.0 µgC/g, like below 0.7 µgC/g.

Preferably said polymer composition comprises polypropylene and/or (a) phenolic antioxidant(s). Even more preferred the polypropylene is the only polymer component within the polymer composition.

To obtain the desired reduction of volatiles, like 2-methyl-1-propene, by keeping the mechanical properties on the desired level, it is appreciated to use the inosilicate in a polymer composition in an amount from 10,000 to 550,000 ppm, preferably from 50,000 to 500,000 ppm, more preferably from 100,000 to 400,000 ppm, yet more preferably from 150,000 to 300,000 ppm.

Surprisingly it has been found out that the use of the inosilicate resolves the problem of polymer composition comprising talc and phneolic antioxidants. The specific selection of inosilicate as a substitute of talc allows reducing drastically the headspace emission of all volatiles, in particular of 2-methyl-1-propene, compared to standard polypropylene compositions comprising talc and phenolic antioxidants. Even more surprising this benefit is not paid with the loss of mechanical properties, like tensile modulus and/or flexural modulus (see table 1).

Even more preferred the present invention is directed to the use of an inosilicate in a polymer composition to accomplish a headspace emission measured according to VDA 277
(a) of all volatiles together of said polymer composition of equal or below 120 µgC/g, preferably below 100 µgC/g, more preferably below 80 µgC/g. still more preferably below 60 µgC/g, like below 30 µgC/g and/or
(b) of 2-methyl-1-propene of said polymer composition of not more than 70 µgC/g, preferably below 20 µgC/g, more preferably below 10 µgC/g. still more preferably below 5 µgC/g, yet more preferably below 1.0 µgC/g, like below 0.7 µgC/g,
wherein further the polymer composition comprises
(a) at least 50 wt.-%, preferably at least 70 wt.-%, more preferably at least 75 wt.-%, polypropylene
(b) 10,000 to 550,000 ppm, preferably 50,000 to 500,000 ppm, more preferably 100,000 to 400,000 ppm, yet more preferably 150,000 to 300,000 ppm, inosilicate(s),
(c) 100 to 5,000 ppm, preferably 500 to 5,000 ppm, more preferably 500 to 3,000 ppm, yet more preferably 1,000 to 2,000 ppm, of phenolic antioxidants, and
(d) optionally 100 to 5,000 ppm, preferably 500 to 3,000 ppm, more preferably 700 to 2,000 ppm, yet more preferably 1,000 to 1,500 ppm, of phosphorous antioxidants
based on the polymer composition. As stated above it is preferred that the polymer composition comprises as polymer said polypropylene only.

As usual 1 ppm of additive corresponds to 1 mg additive in 1 kg composition.

The term "volatiles" is understood according the present invention as substances which tend to vaporize from the polymer composition. More precisely "volatiles" are substances having a rather high vapour pressure and thus vaporize easily from the polymer composition. Thus volatiles according to the present invention are in particular substances having a normal boiling point (temperature at which the vapour pressure is equal to the surrounding atmospheric pressure (1.0 atm)) of not more than 80° C., more preferably of not more than 70° C., like not more than 60° C. The volatiles can be any substances part of the polymer composition and are in particular degradation products cause by chemical and/or physical reactions (processes) within in the polymer compositions. Typically the volatiles are degradation products of the additives of the polymer composition, like degradation products of the phenolic antioxidants. Most important representative of the volatiles is the 2-methyl-1-propene, probably a degradation product of the phenolic antioxidants. The amount of volatiles, like 2-methyl-1-propene, of the polymer composition is determined by VDA 277. The exact measuring method is described in the example section. The analysed amount of volatiles is given by the ratio of the amount [µgC] of volatiles (like 2-methyl-1-propene) to the total amount [g] of the polymer composition. Accordingly in one aspect the use of the an inosilicate in a polymer composition accomplishes a headspace emission measured according to VDA 277 of all volatiles together of said polymer composition of equal or below 120 μgC/g, preferably below 100 μgC/g, more preferably below 80 μgC/g. still more preferably below 60 μgC/g, like below 50 μgC/g. In a second aspect or alternatively the use of the an inosilicate in a polymer composition accomplishes a headspace emission measured according to VDA 277 of 2-methyl-1-propene of said polymer composition of not more than 70 μgC/g, preferably below 20 μgC/g, more preferably below 10 μgC/g. still more preferably below 5 μgC/g, yet more preferably below 1.0 μgC/g, like below 0.7 μgC/g.

The polypropylene used in the polymer composition can be any polypropylene, in particular polypropylenes suitable for the automotive interior and/or for back sheets of blister packaging, like a heterophasic polypropylene or a propylene homopolymer. Accordingly in case of automotive components a preferred polymer composition comprises, more preferably comprises as the only polymer component, a heterophasic propylene copolymer, while in case of blister back sheets a preferred polymer composition comprises, more preferably comprises as the only polymer component, a polypropylene homopolymer.

The expression propylene homopolymer used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment only propylene units in the propylene homopolymer are detectable. The comonomer content can be determined with FT infrared spectroscopy, as described below in the examples.

Heterophasic polypropylene systems are well known in the art and are systems in particular obtained in an at least two step process resulting in a multiphase structure comprising a polypropylene matrix, preferably an isotactic polypropylene matrix, and inclusions dispersed therein comprising amorphous elastomer. Such systems can be easily tailored for the requirements needed by setting the comonomer content in the polypropylene matrix and in the amorphous elastomer respectively. Such a heterophasic propylene copolymer may have an $MFR_2$ in the range of 2.0 to 80.0 g/10 min, more preferably in the range of 5.0 to 50.0 g/10 min, still more preferably in the range of 7.0 to 20.0 g/10 min. Typically such a heterophasic propylene copolymer has an amorphous elastomer being a propylene-ethylene rubber (EPR). The polypropylene matrix can be either a propylene homopolymer or a propylene copolymer, wherein the latter is especially preferred. The total comonomer, preferably ethylene, content is in the range of 2 to 25 wt.-% based on the total heterophasic propylene copolymer. The amount of xylene solubles may be in the range of 10 to 40 wt.-%, preferably 15 to 30 wt.-%.

Of course the polypropylene may additionally comprise beside the heterophasic propylene copolymer a high density polyethylene (HDPE) having for instance a density in the range of 0.954 to 0.966 $g/cm^3$ and a melt flow rate ($MFR_2$ at 190° C.) of 0.1 to 15.0 g/10 min. Further the polypropylene may also comprise additionally EPR, propylene-ethylene copolymers and/or ethylene-octene copolymers.

It is however preferred that the polypropylene is the only polymer component in the polymer composition.

Accordingly it is appreciated that the polypropylene is present in the polymer composition in the amount of at least 50.0 wt.-%, more preferably at least 60.0 wt.-%, yet more preferably at least 70.0 wt.-%, still more preferably of at least 75.0 wt.-%.

Beside the polypropylene the polymer composition is in particular defined by its additives.

Accordingly to be useful in the above mentioned applications the inventive polymer composition must comprise an inorganic reinforcing agent. Talc is normally the additive of choice. However it has been discovered in the present invention that talc promotes the degradation of phenolic antioxidants and thus increases undesirably the amount of volatiles, in particular of 2-methyl-1-propene. Such a degradation of phenolic antioxidants is in particular pronounced in case the talc comprises a considerable amount of residues within in the talc, like iron oxide (FeO) and/or iron silicate. The degradation of the organic oxidants can be very easily deducted in the headspace emission according to VDA 277. The emission spectrum shows degradation products (for instance 2-methyl-1-propene) originating from the phenolic antioxidants.

One possible approach to reduce the amount of volatiles, like 2-methyl-1-propene, is to impede the catalytic activity of talc and/or its residues in view of the phenolic antioxidants. However the addition of further additives to prevent degradation of the phenolic antioxidants may cause other problems and thus it was sought for an alternative approach enabling also a significant reduction of volatiles, like 2-methyle-1-propene, measured according to VDA 277.

The present invention has now found out that the replacement of talc by inosilicate(s) can also significantly reduce the amount of volatiles, in particular of 2-methyl-1-propene, measured as the headspace emission according to VDA 277. More importantly such a substitution does not alter substantially the mechanical properties of the polymer composition. A further finding of the present invention is that not only the amount of volatiles can be reduced due to the specific substitution of talc but also can reduces the smell disturbances measured according the smell detection method according to VDA 270.

Preferably the inosilicate(s) used for the reduction of volatiles of polymer composition is/are (a) single chain inosilicate(s). Even more preferred the inosilicate(s) is/are from the pyroxenoid group. The most preferred inosilicate is Wollastonite ($Ca_3[Si_3O_9]$), like the commercial products NYGLOS 8 (NYCO, USA) and/or NYAD 400 (NYCO, USA).

Preferably the inosilicate(s) according to this invention has/have a particle size (d50%) of below 15.0 μm (d50% indicates that 50 wt-% of the inosilicate has a particle size below 15.0 μm), more preferably in the range of 1.0 to 10.0 μm and/or a particle size (d90%) of below 100.0 μm (d90% indicates that 90 wt-% of the inosilicate has a particle size below 100.0 μm), more preferably in the range of 5.0 to 50.0 μm. Furthermore, the inosilicate(s) according to this invention has/have an average aspect ratio above 4:1, more preferably in the range of 5:1 to 20:1.

It is further appreciated that the polymer composition does not contain a considerable amount of talc, i.e. does not contain more than 5 wt.-%, more preferably not more than 3 wt.-%, yet more preferably not more than 1 wt.-%, still more preferably not more than 0.5 wt.-%, of talc. In a preferred embodiment talc is not detectable within the polymer composition.

As indicated above, the increase of volatiles is in particular observed due to the presence of phenolic antioxidants as they can be degraded due to polymeric environment, i.e. due to other additives like talc. However antioxidants are needed to impair oxidative degradation of the polypropylene. Accordingly the polymer composition for which the inosilicate(s) is/are used preferably contains phenolic antioxidants.

The term "phenolic antioxidant" as used in the instant invention stands for any compound capable of slowing or preventing the oxidation of the polymer component, i.e. the polypropylene. Additionally such a phenolic antioxidant must of course comprise a phenolic residue.

Better results can be achieved in case the phenolic antioxidants are sterically hindered. The term "Sterically hindered" according to this invention means that the hydroxyl group (HO—) of the phenolic antioxidants is surrounded by sterical alkyl residues.

Accordingly the phenolic antioxidants preferably comprise the residue of formula (I)

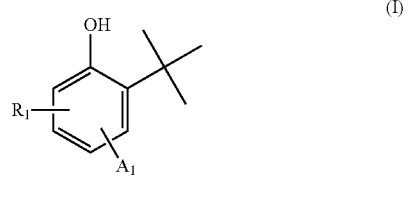

(I)

wherein
$R_1$ being located at the ortho- or meta-position to the hydroxyl-group and $R_1$ is $(CH_3)_3C$—, $CH_3$— or H, preferably $(CH_3)_3C$—, and
$A_1$ constitutes the remaining part of the phenolic antioxidant and is preferably located at the para-position to the hydroxyl-group.

Preferably the phenolic antioxidants preferably comprise the residue of formula (Ia)

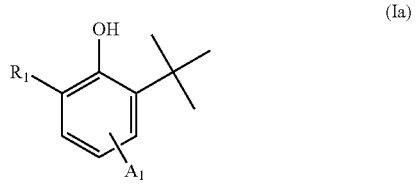

(Ia)

wherein
$R_1$ is $(CH_3)_3C$—, $CH_3$— or H, preferably $(CH_3)_3C$—, and
$A_1$ constitutes the remaining part of the phenolic antioxidant.
Preferably $A_1$ is in para-position to the hydroxyl-group.

Additionally the phenolic antioxidants shall preferably exceed a specific molecular weight.

Accordingly the phenolic antioxidants have preferably a molecular weight of more than 785 g/mol, more preferably more than 1100 g/mol. On the other hand the molecular weight should be not too high, i.e. not higher than 1300 g/mol. A preferred range is from 785 to 1300 g/mol, more preferably from 1000 to 1300 g/mol, yet more preferably from 1100 to 1300 g/mol.

Further the phenolic antioxidants can be additionally defined by the amount of phenolic residues, in particular by the amount of phenolic residues of formula (I) or (Ia). Accordingly the phenolic antioxidants may comprise(s) 1, 2, 3, 4 or more phenolic residues, preferably 1, 2, 3, 4 or more phenolic residues of formula (I) or (Ia).

Moreover the phenolic antioxidants comprise mainly only carbon atoms, hydrogen atoms and minor amounts of O-atoms, mainly caused due to the hydroxyl group (HO—) of the phenolic residues. However the phenolic antioxidants may comprise additionally minor amounts of N, S and P atoms. Preferably the phenolic antioxidants are constituted by C, H, O, N and S atoms only, more preferably the phenolic antioxidants are constituted by C, H and O only.

As stated above the phenolic antioxidants shall have a rather high molecular weight. A high molecular weight is an indicator for several phenolic residues. Thus it is in particular appreciated that the phenolic antioxidants have 4 or more, especially 4, phenolic residues, like the phenolic residue of formula (I) or (Ia).

As especially suitable phenolic antioxidants have been recognized compounds comprising at least one residue of formula (II)

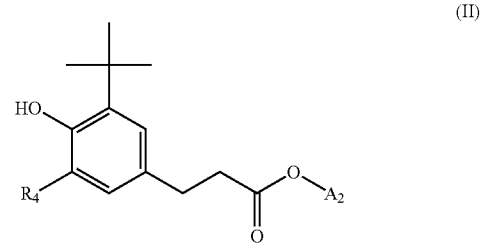

(II)

wherein
$R_4$ is $(CH_3)_3C$—, $CH_3$—, or H, preferably $(CH_3)_3C$—, and
$A_2$ constitutes the remaining part of the phenolic antioxidant.

Considering the above requirements the phenolic antioxidants are preferably selected from the group consisting of
2,6-di-tert-butyl-4-methylphenol (CAS no. 128-37-0; M 220 g/mol),
pentaerythrityl-tetrakis(3-(3,5-di-tert-butyl-4-hydroxyphenyl) propionate (CAS no. 6683-19-8; M 1178 g/mol),
octadecyl 3-(3',5'-di-tert-butyl-4-hydroxyphenyl)propionate (CAS no. 2082-79-3; M 531 g/mol)
1,3,5-trimethyl-2,4,6-tris-(3,5-di-tert-butyl-4-hydroxybenzyl)benzene (CAS no. 1709-70-2; M 775 g/mol),
2,2'-thiodiethylenebis(3,5-di-tert.-butyl-4-hydroxyphenyl) propionate (CAS no. 41484-35-9; M 643 g/mol),
calcium bis(ethyl 3,5-di-tert-butyl-4-hydroxybenzylphosphonate) (CAS no. 65140-91-2; M 695 g/mol),
1,3,5-tris(3',5'-di-tert.butyl-4'-hydroxybenzyl)-isocyanurate (CAS no. 27676-62-6, M 784 g/mol),
1,3,5-tris(4-tert.butyl-3-hydroxy-2,6-dimethylbenzyl)-1,3, 5-triazine-2,4,6-(1H,3H,5H)-trione (CAS no. 40601-76-1, M 813 g/mol),
bis(3,3-bis(3'-tert-butyl-4'-hydroxyphenyl)butanic acid) glycolester (CAS no. 32509-66-3; M 794 g/mol),
4,4'-thiobis(2-tert-butyl-5-methylphenol) (CAS no. 96-69-5; M 358 g/mol),
2,2'-methylene-bis-(6-(1-methyl-cyclohexyl)-para-cresol) (CAS no. 77-62-3; M 637 g/mol),
3,3'-bis(3,5-di-tert-butyl-4-hydroxyphenyl)-N,N'-hexamethylenedipropionamide (CAS no. 23128-74-7; M 637 g/mol),
2,5,7,8-tetramethyl-2-(4',8',12'-trimethyltridecyl)-chroman-6-ol (CAS no. 10191-41-0; M 431 g/mol),
2,2-ethylidenebis(4,6-di-tert-butylphenol) (CAS no. 35958-30-6; M 439 g/mol),
1,1,3-tris(2-methyl-4-hydroxy-5'-tert-butylphenyl) butane (CAS no. 1843-03-4; M 545 g/mol),
3,9-bis(1,1-dimethyl-2-(beta-(3-tert-butyl-4-hydroxy-5-methylphenyl)propionyloxy)ethyl)-2,4,8,10-tetraoxaspiro [5.5]undecane (CAS no. 90498-90-1; M 741 g/mol),
1,6-hexanediyl-bis(3,5-bis(1,1-dimethylethyl)-4-hydroxybenzene)propanoate) (CAS no. 35074-77-2; M 639 g/mol),
2,6-di-tert-butyl-4-nonylphenol (CAS no. 4306-88-1; M 280 g/mol), 4,4'-butylidenebis(6-tert-butyl-3-methylphenol (CAS no. 85-60-9; M 383 g/mol);

2,2'-methylene bis(6-tert-butyl-4-methylphenol) (CAS no. 119-47-1; M 341 g/mol), triethylenglycol-bis-(3-tert-butyl-4-hydroxy-5-methylphenyl) propionate (CAS no. 36443-68-2; M 587 g/mol), a mixture of C13 to C15 linear and branched alkyl esters of 3-(3',5'-di-t-butyl-4'-hydroxyphenyl) propionic acid (CAS no. 171090-93-0; $M_w$ 485 g/mol), 6,6'-di-tert-butyl-2,2'-thiodip-cresol (CAS no. 90-66-4; M 359 g/mol), diethyl-(3,5-di-tert-butyl-4-hydroxybenzyl) phosphate (CAS no. 976-56-7; M 356 g/mol), 4,6-bis(octylthiomethyl)-o-cresol (CAS no. 110553-27-0; M 425 g/mol), benzenepropanoic acid, 3,5-bis(1,1-dimethyl-ethyl)-4-hydroxy-,C7-C9-branched and linear alkyl esters (CAS no. 125643-61-0; $M_w$ 399 g/mol), 1,1,3-tris[2-methyl-4-[3-(3,5-di-tert-butyl-4-hydroxyphenyl)propionyloxy]-5-tert-butylphenyl]butane (CAS no. 180002-86-2; M 1326 g/mol), mixed styrenated phenols (M ca 320 g/mol; CAS no. 61788-44-1; M ca. 320 g/mol), butylated, octylated phenols (M ca 340 g/mol; CAS no. 68610-06-0; M ca 340 g/mol), and butylated reaction product of p-cresol and dicyclopentadiene ($M_w$ 700 to 800 g/mol; CAS no. 68610-51-5; $M_w$ 700-800 g/mol).

More preferably the phenolic antioxidants are selected from the group consisting of pentaerythrityl-tetrakis(3-(3,5-di-tert-butyl-4-hydroxyphenyl) propionate (CAS no. 6683-19-8; M 1178 g/mol), octadecyl 3-(3',5'-di-tert-butyl-4-hydroxyphenyl)propionate (CAS no. 2082-79-3; M 531 g/mol)

bis(3,3-bis(3'-tert-butyl-4'-hydroxyphenyl)butanic acid) glycolester (CAS no. 32509-66-3; M 794 g/mol), 3,3'-bis(3,5-di-tert-butyl-4-hydroxyphenyl)-N,N'-hexamethylenedipropionamide (CAS no. 23128-74-7; M 637 g/mol), 3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; M 741 g/mol), 1,6-hexanediyl-bis(3,5-bis(1,1-dimethylethyl)-4-hydroxybenzene)propanoate) (CAS no. 35074-77-2; M 639 g/mol), triethylenglycol-bis-(3-tert-butyl-4-hydroxy-5-methylphenyl) propionate (CAS no. 36443-68-2; M 587 g/mol), a mixture of C13 to C15 linear and branched alkyl esters of 3-(3',5'-di-t-butyl-4'-hydroxyphenyl) propionic acid (CAS no. 171090-93-0; $M_w$ 485 g/mol), and benzenepropanoic acid, 3,5-bis(1,1-dimethyl-ethyl)-4-hydroxy-,C7-C9-branched and linear alkyl esters (CAS no. 125643-61-0; $M_w$ 399 g/mol), The most preferred phenolic antioxidant is pentaerythrityl-tetrakis(3-(3,5-di-tert-butyl-4-hydroxyphenyl) propionate (CAS no. 6683-19-8; M 1178 g/mol) preferably having the formula (III)

(III)

The present polymer composition may comprise different phenolic antioxidants, as defined in the instant invention, however it is preferred that it comprises only one type of phenolic antioxidant as defined herein.

The polymer composition can additionally comprise one or more phosphorous antioxidants. More preferably the polymer composition comprises only one type of phosphorous antioxidant. Preferred phosphorous antioxidants are selected from the group consisting of tris-(2,4-di-tert-butylphenyl) phosphite (CAS no. 31570-04-4; M 647 g/mol), tetrakis-(2,4-di-tert-butylphenyl)-4,4'-biphenylen-di-phosphonite (CAS no. 38613-77-3; M 991 g/mol), bis-(2,4-di-tert-butylphenyl)-pentaerythrityl-di-phosphite (CAS no. 26741-53-7; M 604 g/mol), di-stearyl-pentaerythrityl-di-phosphite (CAS no. 3806-34-6; M 733 g/mol), tris-nonylphenyl phosphite (CAS no. 26523-78-4; M 689 g/mol), bis(2,6-di-tert-butyl-4-methylphenyl)pentaerythrityl-di-phosphite (CAS no. 80693-00-1; M 633 g/mol), 2,2'-methylenebis(4,6-di-tert-butylphenyl) octyl-phosphite (CAS no. 126050-54-2; M 583 g/mol), 1,1,3-tris(2-methyl-4-ditridecyl phosphite-5-tert-butylphenyl) butane (CAS no. 68958-97-4; M 1831 g/mol), 4,4'-butylidenebis(3-methyl-6-tert-butylphenyl-di-tridecyl) phosphite (CAS no. 13003-12-8; M 1240 g/mol), bis-(2,4-dicumylphenyl)pentaerythritol diposphite (CAS no. 154862-43-8; M 852 g/mol), bis(2-methyl-4,6-bis(1,1-dimethylethyl)phenyl) phosphorous acid ethylester (CAS no. 145650-60-8; M 514 g/mol), 2,2',2"-nitrilo triethyl-tris(3,3',5,5'-tetra-tert-butyl-1,1'-biphenyl-2,2'-diyl)phosphite) (CAS no. 80410-33-9; M 1465 g/mol)

2,4,6-tris(tert-butyl)phenyl-2-butyl-2-ethyl-1,3-propandiol-phosphit (CAS no. 161717-32-4, M 450 g/mol), 2,2'-ethyliden-bis(4,6-di-tert-butylphenyl)fluorphosphonit (CAS no. 118337-09-0; M 487 g/mol), 6-(3-(3-tert-butyl-4-hydroxy-5-methylphenyl)propoxy)-2,4,8,10-tetra-tert-butyldibenz[d,f][1.3.2]dioxaphosphepin (CAS no. 203255-81-6; M 660 g/mol), tetrakis-(2,4-di-tert-butyl-5-methylphenyl)-4,4'-biphenylen-di-phosphite (CAS no. 147192-62-9; M 1092 g/mol), and 1,3-bis-(diphenylphosphino)-2,2-dimethylpropane (CAS no. 80326-98-3; M 440.5 g/mol).

Especially suitable are organic phosphites, in particular those as defined in the above list, as phosphorous antioxidants.

The most preferred phosphorous antioxidant is tris-(2,4-di-tert-butylphenyl) phosphite (CAS no. 31570-04-4; M 647 g/mol).

As stated above known polymer compositions comprising talc and phenolic antioxidants suffer from a rather quick degradation of the antioxidants. Such quick degradation is caused by the presence of talc and more importantly by the residues within in the talc. These residues may catalyse the degradation of the organic antioxidants. Thus especially in case the polymer composition for which the inosilicate is used contains small amounts of talc (but also in cases in which the polymer compositions contains no talc), said polymer composition can contain further additives which may impede the catalytic activity of talc and/or other reinforcing agents in view of the phenolic antioxidants and thus reduces the degradation process and associated therewith minimises the headspace emission.

It has been in particular discovered that polyethers are in particular useful. Polyethers are generally speaking polymers with more than one ether group. Accordingly polyethers are preferably polyethers with a weight average molecular weight ($M_w$) of at least 300 g/mol, more preferably of at least 700 g/mol. More preferably such polyethers (D) have a weight average molecular weight ($M_w$) of not more than 13,000 g/mol. In one preferred embodiment the polyethers according to this invention have weight average molecular weight ($M_w$) of 300 to 12,000 g/mol, more preferably of 700 to 8,000 g/mol and yet more preferably of 1150 to 8,000 g/mol.

Without be bonded on the theory the polyethers as used in herein are able to bond on the surface of the talc or other reinforcing agents, like the inosilicate(s), and thus form a kind of sheeting surrounding the talc particles or reinforcing agent particles. The bonding may be a covalent bonding and/or ionic bonding. Accordingly the polyethers impede contacting of the phenolic antioxidants with the talc and/or with the reinforcing agents, like the inosilicate. Thus any degradation caused by talc and/or by other reinforcing agents, like the inosilicate(s) is therewith minimized or avoided.

As especially useful polyethylene glycols and/or epoxy resins have been recognized In case polyethylene glycols are present in the polymer composition the following are preferred: polyethylene glycol having a weight average molecular weight ($M_w$) of about 4,000 g/mol (CAS-no 25322-68-3), polyethylene glycol having a weight average molecular weight ($M_w$) of about 8,000 g/mol (CAS-no 25322-68-3), polyethylene glycol having a weight average molecular weight ($M_w$) of about 10,000 g/mol (CAS-no 25322-68-3) and/or polyethylene glycol having a weight average molecular weight ($M_w$) of about 20,000 g/mol (CAS-no 25322-68-3). Especially preferred polyethylene glycols ($D^1$) are PEG 4000 and/or PEG 10000 of Clariant.

Epoxy resins are in particular appreciated as they comprise reactive epoxy groups simplifying a covalent bonding of the epoxy resin with talc and/or other reinforcing agents, like the inosilicate(s). Accordingly the epoxy resins are tightly bonded on the surface of the talc and/or other reinforcing agents, like the inosilicate(s), and therefore provide an especially suitable protection against degradation of the phenolic antioxidants. Even more preferred the epoxy resins comprise phenyl groups. Such phenyl groups have the additional advantage that they act as scavengers for possible degradation products of the phenolic antioxidants. Without be bonded on the theory it is very likely that the phenyl groups of the epoxy resins will be Friedel-Crafts alkylated. Typically the alkylating groups originate from the phenolic antioxidants. One example is 2-methyl-1-propene, a typical degradation product of hindered phenolic antioxidants as defined above. Accordingly it is preferred that the polymer composition for which the inosilicate used comprises epoxy resins comprising units derived from a monomer of the formula (IV)

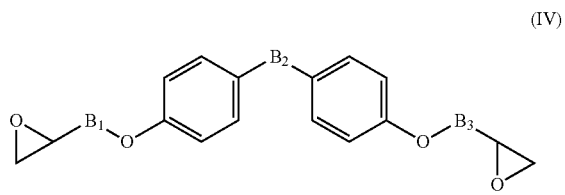

(IV)

wherein
$B_1$ and $B_3$ are independently selected from the group consisting of —$(CH_2)$—, —$(CH_2)_2$—, —$(CH_2)_3$—, —$(CH_2)_4$—, and —$(CH_2)_5$—, preferably $B_1$ and $B_3$ are —$(CH_2)$—, and
$B_2$ is selected from the group consisting of —$((CH_3)_2C)$—, —$((CH_3)_2C)_2$—, —$((CH_3)_2C)_3$—, —$CH_2$—$((CH_3)_2C)$—, —$((CH_3)_2C)$—$CH_2$—, —$CH_2$—$((CH_3)_2C)$—$CH_2$— and —$CH_2$—$((CH_3)_2C)_2$—$CH_2$—, preferably $B_2$ is —$((CH_3)_2C)$—. Thus it is appreciated that the epoxy resins comprises units derived from a monomer of the formula (IV-a)

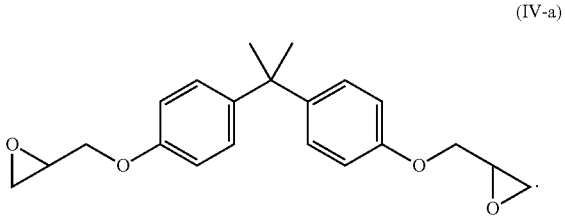 [SMILES: CC(C)(c1ccc(OCC2CO2)cc1)c1ccc(OCC2CO2)cc1]

(IV-a)

Further it is preferred that the epoxy resins comprises not only units derived from a monomer of the formula (IV) or (IV-a) but additionally units derived from a monomer of the formula (V)

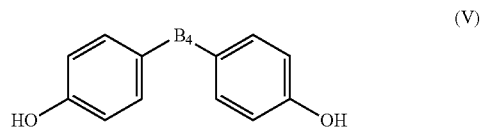

(V)

wherein
$B_4$ is selected from the group consisting of —$((CH_3)_2C)$—, —$((CH_3)_2)$—, —$((CH_3)_2)$—, —$CH_2$—$((CH_3)_2C)$—, —$((CH_3)_2C)$—$CH_2$, —$CH_2$—$((CH_3)_2C)$—$CH_2$— and —$CH_2$—$((CH_3)_2C)_2$—$CH_2$—. Especially preferred are monomers of formula (V), wherein $B_4$ is —$((CH_3)_2C)$—.

Accordingly the epoxy resins have preferably the formula (VI)

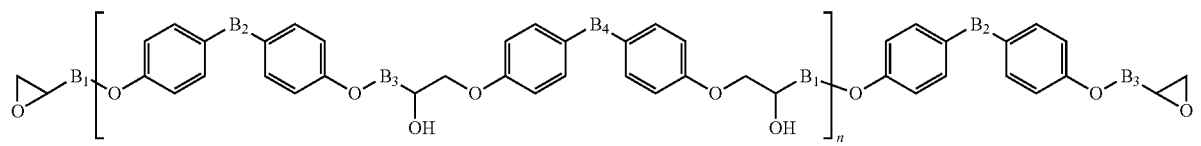

(VI)

wherein

B₁ and B₃ are independently selected from the group consisting of —(CH₂)—, —(CH₂)₂—, —(CH₂)₃—, —(CH₂)₄—, and —(CH₂)₅—, B₂ and B₄ are independently selected from the group consisting of —((CH₃)₂C)—, —((CH₃)₂C)₂—, —((CH₃)₂C)₃—, —CH₂—((CH₃)₂C)—, —((CH₃)₂C)—CH₂—, —CH₂—((CH₃)₂C)—CH₂— and —CH₂—((CH₃)₂C)₂—CH₂—, and n is from 1 to 20.

Additionally it is preferred that the epoxy resins have an epoxy index in the range of 1.10 to 2.00 Eq/kg, more preferably 1.12 to 1.60 Eq/kg, wherein the epoxy index corresponds to the number of epoxy functions in respect of 100 g of resin.

The most preferred epoxy resin is poly(2,2-bis[4-(2,3-epoxypropoxy]-phenyl] propane-co-(2-chloromethyl oxirane) (CAS-no 25036-25-3), in particular with an epoxy index as defined in the previous paragraph.

Additionally or alternatively to the polyethers as defined above the polymer composition for which the inosilicate(s) is/are used may contain carbonyl compounds (D), like carboxylic acids, carboxylic acid amides and/or carboxylic acid esters. Such carbonly compounds achieve the same effect as the polyethers, namely to form a kind of sheeting surrounding the talc particles and/or the reinforcing agents.

As especially useful aromatic carboxylic acids, fatty acid amides and fatty acid esters have been recognized.

In case the polymer composition comprises carboxylic acids the benzoic acid is most preferred.

In case the polymer composition comprises carboxylic acid amides it is preferred that the carboxylic acid amides have C10 to C25 carbon atoms, more preferably C16 to C24 carbon atoms. Even more preferred the carboxylic acid amides are fatty acid amides having C10 to C25 atoms, like C16 to C24 carbon atoms. Particularly the carboxylic acid amides are unsaturated. Thus unsaturated fatty acid amides, like unsaturated fatty acid amides having C10 to C25 atoms, like C16 to C24 carbon atoms, are especially appreciated. Accordingly the carboxylic acid amides are preferably selected from the group consisting of 13-docosenamide (CAS no. 112-84-5), 9-octadecenamide (CAS no. 301-02-0), stearamide (CAS no. 124-26-5) and behenamide (CAS no. 3061-75-4). The most preferred carboxylic acid amide is 13-docosenamide (CAS no. 112-84-5).

In case the polymer composition comprises carboxylic acid ester, like fatty acid ester, it is appreciated that the carboxylic acid esters are glycerol esters of the formula (VII)

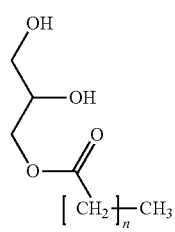

(VII)

wherein n is 5 to 25, preferably 10 to 18.

Alternatively the carboxylic acid esters can be glycerol esters of the formula (VIII-a) or (VIII-b)

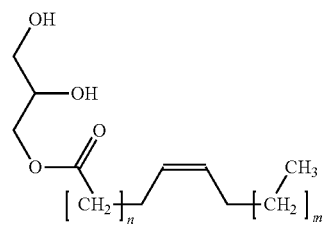

(VIII-a)

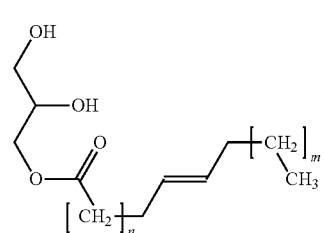

(VIII-b)

wherein n and m are independently 1 to 9, preferably 4 to 8. More preferably n and m are identically.

Accordingly the carboxylic acid esters are preferably selected from the group consisting of glycerol monostearate, glycerol monolaurate and 1,3-dihydroxypropan-2-yl(Z)-octadec-9-enoate.

As further additives the polymer composition preferably comprise(s) at least one hindered amine light stabilizer. Accordingly such hindered amine light stabilizers (HALS) are present in an amount of 800 to 2,500 ppm, more preferably of 900 to 2,000 ppm, yet more preferably of 1,200 to 1,600 ppm, in the polymer composition.

Hindered amine light stabilizers (HALS) are known in the art. Preferably such hindered amine light stabilizers (HALS) are 2,6-alkyl-piperidine derivatives in particular 2,2,6,6-tetramethyl-piperidine derivatives. Especially suitable are hindered amine light stabilizers (HALS) of the formula (IX)

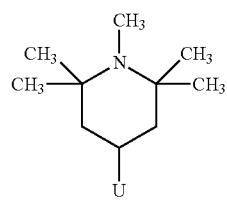

wherein U constitutes the remaining part of the hindered amine light stabilizer (HALS).

The hindered amine light stabilizers (HALS) do not absorb UV radiation, but act to inhibit degradation of the polypropylene. They slow down the photochemically initiated degradation reactions, to some extent in a similar way to antioxidants.

The hindered amine light stabilizers (HALS) show a high efficiency and longevity due to a cyclic process wherein the hindered amine light stabilizers (HALS) are regenerated rather than consumed during the stabilization process. Accordingly, one advantage of the hindered amine light stabilizers (HALS) is that significant levels of stabilization are achieved at relatively low concentrations.

Accordingly the hindered amine light stabilizer(s) (HALS) is(are) preferably selected from the group consisting of bis-(2,2,6,6-tetramethyl-4-piperidyl) sebacate (CAS no. 52829-07-9; $M_w$ 481 g/mol), bis-(1,2,2,6,6-pentamethyl-4-piperidyl) sebacate (CAS no. 41556-26-7; $M_w$ 509 g/mol), tetrakis(2,2,6,6-tetramethyl-4-piperidyl)-1,2,3,4-butane tetracarboxylate (CAS no. 64022-61-3; $M_w$ 792 g/mol), tetrakis(1,2,2,6,6-pentamethyl-4-piperidyl)-1,2,3,4-butane tetracarboxylate (CAS no. 91788-83-9; $M_w$ 847 g/mol), 1,2,3-tris(1,2,2,6,6-pentamethyl-4-piperidyl)-4-tridecyl butane-1,2,3,4-tetracarboxylate (CAS no. 84696-72-0; $M_w$ ca. 900 g/mol), 1,2,3-tris(2,2,6,6-tetramethyl-4-piperidyl)-4-tridecyl butane-1,2,3,4-tetracarboxylate (CAS no. 84696-71-9; $M_w$, ca. 900 g/mol), 2,2,4,4-tetramethyl-7-oxa-3,20-diaza-dispiro(5.1.11.2)-heneicosan-21-on (CAS no. 64338-16-5; $M_w$ 364 g/mol), di-(1,2,2,6,6-pentamethylpiperidin-4-yl) p-methoxybenzylidenemalonate (CAS no. 147783-69-5; $M_w$ 528 g/mol), N,N'-bisformyl-N,N'-bis-(2,2,6,6-tetramethyl-4-piperidinyl)-hexamethylendiamine (CAS no. 124172-53-8; $M_w$ 450 g/mol), dimethyl succinate polymer with 4-hydroxy-2,2,6,6-tetramethyl-1-piperidin ethanol (CAS no. 65447-77-0; $M_w$>2500 g/mol), poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), 1,3,5-triazine-2,4,6-triamine, $N_5N'''$-1,2-ethanediylbis[N-[3-[[4,6-bis[butyl(1,2,2,6,6-pentamethyl-4-piperidinyl) amino]-1,3,5-triazin-2-yl]amino]propyl]-N',N''-dibutyl-N',N''-bis(1,2,2,6,6-pentamethyl-4-piperidinyl)—(CAS no. 106990-43-6; $M_w$ 2286 g/mol), bis-(1-octyloxy-2,2,6,6-tetramethyl-4-piperidinyl) sebacate (CAS no. 129757-67-1; $M_w$ 737 g/mol), 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (CAS no. 192268-64-7; $M_w$ 2600-3400 g/mol), bis(1,2,2,6,6-pentamethyl-4-piperidinyl)-(3,5-bis(1,1-dimethylethyl)-4-hydroxyphenylmethyl) propandioate (CAS no. 63843-89-0; $M_w$ 685 g/mol), 2,9,11,13,15,22,24,26,27,28,-decaazatricyclo (21.3.1.110.14)octacosa-1(27),10,12,14(28),23,25-hexaene-12,25-diamine, N,N'-bis(1,1,3,3-tetramethylbutyl)-2,9,15,22-tetrakis(2,2,6,6-tetramethyl-4-piperidinyl) (CAS no. 86168-95-8; $M_w$>320 g/mol), poly((6-morpholino-s-triazine-2,4-diyl)(2,2,6,6-tetramethyl-4-piperidyl)imino)hexamethylene(2,2,6,6-tetramethyl-4-piperidyl)imino)) (CAS no 82451-48-7, $M_w$ 1600 g/mol), poly((6-morpholino-s-triazine-2,4-diyl)(2,2,6,6-tetramethyl-4-piperidyl)imino)hexamethylene(1,2,2,6,6-pentamethyl-4-piperidyl)imino)) (CAS no 193098-40-7; $M_w$ ca. 1700 g/mol), polymer of 2,2,4,4-tetxamethyl-7-oxa-3,20-diaza-20-(2,3-epoxi-propyl)-dispiro-(5.1.11.2)-heneicosane-21-one and epichlorohydrin (CAS no. 292483-55-4; $M_w$ ca. 1500 g/mol), 1,3-propanediamine, N,N''-1,2-ethanediylbis-,polymer with 2,4,6-trichloro-1,3,5-triazine, reaction products with N-butyl-2,2,6,6-tetramethyl-4-piperidinamine (CAS no. 136504-96-6; $M_w$ ca. 3000 g/mol), 1,2,3,4-butanetetracarboxylic acid, polymer with beta, beta, beta', beta'-tetramethyl-2,4,8,10-tetraoxospiro(5.5) undecane-3,9-diethanol, 1,2,2,6,6-pentamethyl-4-piperidinyl ester (CAS no. 101357-36-2; $M_w$ ca. 2000 g/mol)

2,4,8,10-tetraoxospiro(5.5) undecane-3,9-diethanol, beta, beta, beta', beta'-tetramethyl-, polymer with 1,2,3,4-butanetetracarboxylic acid, 2,2,6,6-tetramethyl-4-piperidinyl ester (CAS no. 101357-37-3, $M_w$ ca. 1900 g/mol)

polymethylpropyl-3-oxy-4(2,2,6,6-tetramethyl)piperidinyl) siloxane (CAS no 182635-99-0)

N(2,2,6,6-tetramethyl-4-piperidyl)-maleinimid, $C_{20}$:$C_{24}$-olefin-copolymer (CAS no. 152261-33-1; $M_w$ ca. 3500 g/mol), and 4-(3-(3,5-di-t-butyl-4-hydroxyphenyl)propionyloxy)-1-(2-(3-(3,5-di-t-butyl-4-hydroxy)propionyloxy)ethyl)-)-2,2,6,6-tetramethylpiperidine (CAS no. 73754-27-5; $M_w$ 772 g/mol)

Especially preferred the hindered amine light stabilizer(s) (B) is(are) selected from the group consisting of bis-(2,2,6,6-tetramethyl-4-piperidyl) sebacate (CAS no. 52829-07-9; $M_w$ 481 g/mol), bis-(1,2,2,6,6-pentamethyl-4-piperidyl) sebacate (CAS no. 41556-26-7; $M_w$ 509 g/mol), tetrakis(2,2,6,6-tetramethyl-4-piperidyl)-1,2,3,4-butane tetracarboxylate (CAS no. 64022-61-3; $M_w$ 792 g/mol), tetrakis(1,2,2,6,6-pentamethyl-4-piperidyl)-1,2,3,4-butane tetracarboxylate (CAS no. 91788-83-9; $M_w$ 847 g/mol), 1,2,3-tris(1,2,2,6,6-pentamethyl-4-piperidyl)-4-tridecyl butane-1,2,3,4-tetracarboxylate (CAS no. 84696-72-0; $M_w$ ca. 900 g/mol), 1,2,3-tris(2,2,6,6-tetramethyl-4-piperidyl)-4-tridecyl butane-1,2,3,4-tetracarboxylate (CAS no. 84696-71-9; $M_w$, ca. 900 g/mol), N,N'-bisformyl-N,N'-bis-(2,2,6,6-tetramethyl-4-piperidinyl)-hexamethylendiamine (CAS no. 124172-53-8; $M_w$ 450 g/mol), 1,3,5-triazine-2,4,6-triamine, $N_5N'''$-1,2-ethanediylbis[N-[3-[[4,6-bis[butyl(1,2,2,6,6-pentamethyl-4-piperidinyl) amino]-1,3,5-triazin-2-yl]amino]propyl]-N',N''-dibutyl-N',N''-bis(1,2,2,6,6-pentamethyl-4-piperidinyl)—(CAS no. 106990-43-6; $M_w$ 2286 g/mol), and bis-(1-octyloxy-2,2,6,6-tetramethyl-4-piperidinyl) sebacate (CAS no. 129757-67-1; $M_w$ 737 g/mol).

The most preferred hindered amine light stabilizer(s) (HALS) is(are) 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(CAS no. 106990-43-6; $M_w$ 2286 g/mol) of formula (X)

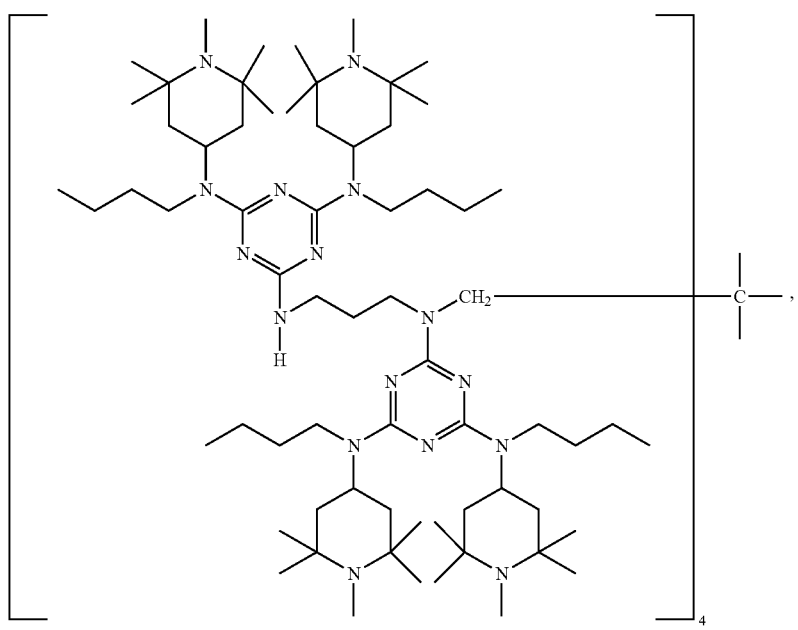

poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), and bis-(2,2,6,6-tetramethyl-4-piperidyl) sebacate (CAS no. 52829-07-9; $M_w$ 481 g/mol) of formula (XI)

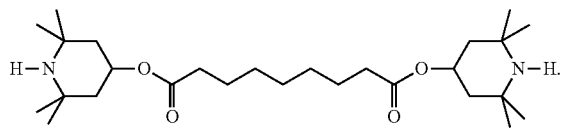

It has been further discovered that especially good results are achievable in case the hindered amine stabilizers (HALS) have a rather high molecular weight, i.e. a $M_w$ higher than 1000 g/mol, more preferably higher than 2000 g/mol. Accordingly hindered amine stabilizers (HALS) of the above mentioned list with a $M_w$ higher than 1000 g/mol, more preferably higher than 2000 g/mol are especially preferred. Thus 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N'''-dibutyl-N',N'''-bis(1,2,2,6,6-pentamethyl-4-piperidinyl)—(CAS no. 106990-43-6; $M_w$ 2286 g/mol) of formula (X) and poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol) are especially suitable as hindered amine light stabilizers (HALS).

As stated above the polymer composition comprises at least one hindered amine light stabilizer (HALS) as defined above. Preferably however the present invention comprises one or two different hindered amine light stabilizers (HALS).

Additionally it is appreciated that the polymer composition comprises at least one slip agent being a fatty acid amide. Accordingly such slip agents are present in an amount of 1,000 to 2,000 ppm, and more preferably of 1,200 to 1,600 ppm, in the polymer composition. More preferably the polymer composition comprises only one slip agent. Preferred types of slip agents are unsaturated fatty acid amides. The amount of carbons of the fatty acids is preferably in the range of C10 to C25 carbon atoms.

Accordingly the slip agent(s) is(are) preferably selected from the group consisting of cis-13-docosenoic amide (CAS no. 112-84-5; $M_w$ 337.6 g/mol), cis-9,10 octadecenoamide (CAS no. 301-02-0; $M_w$ 281.5 g/mol)

octadecanoylamide (CAS no. 124-26-5; $M_w$ 283.5 g/mol), behenamide (CAS no. 3061-75-4; $M_w$ 339.5 g/mol), N,N'-ethylene-bis-stearamide (CAS no. 110-30-5; $M_w$ 588 g/mol), N-octadecyl-13-docosenamide (CAS no. 10094-45-8; $M_w$ 590 g/mol), and oleylpalmitamide (CAS no. 16260-09-6; $M_w$ 503 g/mol)

Especially suitable is(are) cis-13-docosenoic amide (CAS no. 112-84-5; $M_w$ 337.6 g/mol) and/or cis-9,10 octadecenoamide (CAS no. 301-02-0; $M_w$ 281.5 g/mol).

Considering the above given information the present invention is directed to the use of an inosilicate in a polymer composition to accomplish a headspace emission measured according to VDA 277

(a) of all volatiles together of said polymer composition of equal or below 120 μgC/g, preferably below 100 μgC/g, more preferably below 80 μgC/g. still more preferably below 60 μgC/g, like below 50 μgC/g and/or (b) of 2-methyl-1-propene of said polymer composition of not more than 70 μgC/g, preferably below 20 μgC/g, more preferably below 10 μgC/g. still more preferably below 5 μgC/g, yet more preferably below 1.0 μgC/g, like below 0.7 μgC/g, wherein further the polymer composition comprises (a) at least 50 wt.-%, preferably at least 70 wt.-%, more preferably at least 75 wt.-%, polypropylene, like heterophasic propylene copolymer (b) 10,000 to 550,000 ppm, preferably 50,000 to 500,000 ppm, more preferably 100,000 to 400,000 ppm, yet more preferably 150,000 to 300,000 ppm, inosilicate(s), like Wollastonite ($Ca_3[Si_3O_9]$), (c) 100 to 5,000 ppm, preferably 500 to 5,000 ppm, more preferably 500 to 3,000 ppm, yet more preferably 200 to 1,000 ppm, of phenolic antioxidants, like pentaerythrityl-tetrakis (3-(3,5-di-tert-butyl-4-hydroxyphenyl) propionate (CAS no. 6683-19-8; M 1178 g/mol), (d) optionally 100 to 5,000 ppm, preferably 500 to 3,000 ppm, more preferably 500 to 1,500 ppm, yet more preferably 1,000 to 1,500 ppm, of phosphorous antioxidants, like tris-(2,4-di-tert-butylphenyl) phosphite (CAS no. 31570-04-4; M 647 g/mol), (e) optionally 100 to 20,000 ppm, preferably 100 to 10,000 ppm, more preferably 500 to 5,000 ppm, yet more preferably 500 to 3,000 ppm, still more preferably 800 to 3,000 ppm, polyethers, preferably polyethylene glycols and/or epoxy resins, like poly(2,2-bis[4-(2,3-epoxypropoxy]-phenyl] propane-co-(2-chloromethyl oxirane) (CAS-no 25036-25-3), and (f) optionally 100 to 8,000 ppm, preferably 500 to 5,000 ppm, more preferably 500 to 3,000 ppm, yet more preferably 800 to 3,000 ppm, of carbonyl compounds selected from the group consisting of carboxylic acid, like aromatic carboxylic acid (benzoic acid), carboxylic acid amide, like fatty acid amide, and carboxylic acid ester, like fatty acid ester (e.g. glycerol ester according to formulas (VII), (VIII-a) and (VIII-b)), as defined in the instant invention, (g) optionally 800 to 2500 ppm, more preferably 900 to 2000 ppm, preferably 1200 to 1600 ppm, of hindered amine light stabilizer(s) with $M_w$ higher than 1000 g/mol, more preferably higher than 2000 g/mol, like 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)—(CAS no. 106990-43-6; $M_w$ 2286 g/mol) of formula (VIII) and/or poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), (h) optionally 1000 to 2000 ppm, preferably 1200 to 1600 ppm, of slip agent being a fatty acid amide, preferably cis-13-docosenoic amide (CAS no. 112-84-5; $M_w$ 337.6 g/mol) and/or cis-9,10 Octadecenoamide (CAS no. 301-02-0; $M_w$ 281.5 g/mol), more preferably cis-9,10 Octadecenoamide (CAS no. 301-02-0; $M_w$ 281.5 g/mol)

based on the polymer composition. As stated above it is preferred that the polymer composition comprises as polymer said polypropylene only.

Of course the polymer composition may comprise further additives like calcium stearate and/or pigments, for instance in the form of a master batch.

The polymer composition with the reduced amount of volatiles is preferably obtained by extruding the polymer and thereby adding the additives as mentioned in the instant invention. Preferably a twin-screw extruder is used, like the twin-screw extruder ZSK40. The polymer composition pelletized with the twin-screw extruder ZSK 40 is used in the headspace emission test according to VDA 277.

The present invention is additionally directed to polymer composition comprising (a) at least 50 wt.-%, preferably at least 70 wt.-%, more preferably at least 75 wt.-%, polypropylene, like heterophasic propylene copolymer (b) 1,000 to 550,000 ppm, preferably 50,000 to 500,000 ppm, more preferably 100,000 to 400,000 ppm, yet more preferably 150,000 to 300,000 ppm, inosilicate(s), like Wollastonite ($Ca_3[Si_3O_9]$), (c) 100 to 5,000 ppm, preferably 500 to 5,000 ppm, more preferably 500 to 3,000 ppm, yet more preferably 200 to 1,000 ppm, of phenolic antioxidants, like pentaerythrityl-tetrakis (3-(3,5-di-tert-butyl-4-hydroxyphenyl) propionate (CAS no. 6683-19-8; M 1178 g/mol), (d) optionally 100 to 5,000 ppm, preferably 500 to 3,000 ppm, more preferably 500 to 1,500 ppm, yet more preferably 1,000 to 1,500 ppm, of phosphorous antioxidants, like tris-(2,4-di-tert-butylphenyl) phosphite (CAS no. 31570-04-4; M 647 g/mol), (e) optionally 100 to 20,000 ppm, preferably 100 to 10,000 ppm, more preferably 500 to 5,000 ppm, yet more preferably 500 to 3,000 ppm, still more preferably 800 to 3,000 ppm, polyethers, preferably polyethylene glycols and/or epoxy resins, like poly(2,2-bis[4-(2,3-epoxypropoxy]-phenyl] propane-co-(2-chloromethyl oxirane) (CAS-no 25036-25-3), (f) optionally 100 to 8,000 ppm, preferably 500 to 5,000 ppm, more preferably 500 to 3,000 ppm, yet more preferably 800 to 3,000 ppm, of carbonyl compounds selected from the group consisting of carboxylic acid, like aromatic carboxylic acid (benzoic acid), carboxylic acid amide, like fatty acid amide, and carboxylic acid ester, like fatty acid ester (e.g. glycerol ester according to formulas (VII), (VIII-a) and (VIII-b)), as defined in the instant invention, (g) optionally 800 to 2500 ppm, more preferably 900 to 2000 ppm, preferably 1200 to 1600 ppm, of hindered amine light stabilizer(s) with $M_w$, higher than 1000 g/mol, more preferably higher than 2000 g/mol, like 1,3,5-triazine-2,4,6-triamine, $N_5N'''$-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)—(CAS no. 106990-43-6; $M_w$ 2286 g/mol) of formula (VIII) and/or poly((6-((1,1,3,3-tetramethylbutyl)amino)-1,3,5-triazin-2,4-diyl)-(2,2,6,6-tetramethyl-4-piperidyl)imino)-hexamethylen-((2,2,6,6-tetramethyl-4-piperidyl)imino)) (CAS no. 71878-19-8; $M_w$>2500 g/mol), and (h) optionally 1000 to 2000 ppm, preferably 1200 to 1600 ppm, of slip agent being a fatty acid amide, preferably cis-13-docosenoic amide (CAS no. 112-84-5; $M_w$ 337.6 g/mol) and/or cis-9,10 Octadecenoamide (CAS no. 301-02-0; $M_w$ 281.5 g/mol), more preferably cis-9,10 Octadecenoamide (CAS no. 301-02-0; $M_w$ 281.5 g/mol) based on the polymer composition, wherein the headspace emission measured according to VDA 277

(i) of all volatiles together of said polymer composition is of equal or below 120 µgC/g, preferably below 100 µgC/g, more preferably below 80 µgC/g. still more preferably below 60 µgC/g, like below 50 µgC/g, and/or (ii) of 2-methyl-1-propene of said polymer composition is of not more than 70 µgC/g, preferably below 20 µgC/g, more preferably below 10 µgC/g. still more preferably below 5 µgC/g, yet more preferably below 1.0 µgC/g, like below 0.7 µgC/g.

Preferably the polymer composition comprises said polypropylene as the only polymer. Concerning the individual components of the polymer composition it is referred to the comments made above.

Further the polymer composition is used as a covering element for vehicles and/or back sheets of blister packaging, in particular to accomplish headspace emission according to VDA 277, in particular to accomplish the headspace emission of 2-methyl-1-propene according to VDA 277, as defined in the instance invention.

Furthermore the present invention is directed to articles, preferably automotive articles, more preferably automotive interior articles, like dashboards, door claddings, armrests or other interior trims, comprising the polymer composition as defined herein. The invention is further directed to blister packaging, in particular to the back sheets of blister packaging, comprising the polymer composition of the instant invention.

The present invention is further described by way of examples.

EXAMPLES

The following definitions of terms and determination of methods apply for the above general description of the invention as well as to the below examples unless otherwise defined.

Molecular Weights, Molecular Weight Distribution (Mn, Mw, MWD)

Mw/Mn/MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of between 100-500 µm and spectra recorded in transmission mode. Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

$MFR_2$ (230° C.) is measured according to ISO 1133 (230° C., 2.16 kg load).

Ethylene content is measured with Fourier transform infrared spectroscopy (FTIR) calibrated with $^{13}C$-NMR. When measuring the ethylene content in polypropylene, a thin film of the sample (thickness about 250 µm was prepared by hot-pressing. The area of absorption peaks 720 and 733 $cm^{-1}$ was measured with Perkin Elmer FTIR 1600 spectrometer. The method was calibrated by ethylene content data measured by $^{13}C$-NMR.

Particle size is measured according to ISO 13320-1:1999

The xylene solubles (XS, wt.-%): Content of Xylene solubles (XS) is determined at 23° C. according ISO 6427.

Tensile Modulus is evaluated according to ISO 527-1 (cross head speed=1 mm/min; 23° C.) using injection molded specimens as described in EN ISO 294-1 (multipurpose test specimen as described in ISO 527-2,).

Flexural Modulus The flexural modulus was determined in 3-point-bending according to ISO 178 on injection molded specimens of 80×10×4 mm prepared in accordance with ISO 294-1:1996.

Crystallization Temperature Tc

Crystallization temperature is determined by differential scanning calorimetry (DSC) measurement according to ISO 11357-1,2,3 at a cooling rate of 10 K/min after a first heating to 200° C.

VDA 277 (available for instance from "Dokumentation Kraftfahrwesen (DKF); Ulrichstraβe 14, 74321 Bietigheim Bissingen)

The content of volatiles is determined according to VDA 277:1995 using a gas chromatography (GC) device with a WCOT-capillary column (wax type) of 0.25 mm inner diameter and 30 m length. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

In addition to the FID detector for the summary volatile evaluation a MS detector is used for the evaluation of the single volatile components. A specific Quadropol MS was used with the following settings: 280° C. transfer-line temperature, scan method with scanning rate of 15-600 amu, relative EMV mode, mass calibration with standard spectra autotune, MS source temperature of 230° C. and MS Quad temperature of 150° C.

VDA 270-Method for to detect the sensory impression of smell (available for instance from "Dokumentation Kraftfahrwesen (DKF); Ulrichstraβe 14, 74321 Bietigheim Bissingen)

Testing Sets a) heat chamber with air circulation according to DIN 50 011-12; accuracy class 2
b) 1 or 3 litre glass testing cup with unscented sealing and lid; the cup, the sealing and the lid have to be cleaned before use.

TABLE 1

| | | Specimen | |
|---|---|---|---|
| Variant | Examples | Sample quantity for 1 liter cup | Sample quantity for 3 liter cup |
| A | Clips, plug, other small parts | 10 +/− 1 g | 30 +/− 3 g |
| B | Arm rest, ash tray, handhold, sunshade and other medium sized parts | 20 +/− 2 g | 60 +/− 6 g |
| C | Insulating material, foils, leather, cover fabric, cellular material, like foam, carpets and other large-scale parts | 50 +/− 5 g | 150 +/− 15 g |

In case of variant C the material thickness is less than 3 mm, in the 1-litre testing cup a specimen of 200+/−20 $cm^2$ is used whereas in the 3-litre testing cup a specimen of 600+/−60 $cm^2$ is used. In case the material thickness is more than 20 mm, the specimen used must be trimmed to a size of below 20 mm. Sandwich-assemblies are tested as a whole. In case of small parts, several specimens have to be used to obtain the desired amount to be tested.

Procedure

Three different storage conditions are available (table 2). In the present application variant 3 has been used.

TABLE 2

Storage conditions

| Variant | Temperature | Storage period | Note |
|---|---|---|---|
| 1 | 23 +/− 2° C. | 24 +/− h | a, b, c, d, f |
| 2 | 40 +/− 2° C. | 24 +/− h | a, b, c, d, f |
| 3 | 80 +/− 2° C. | 2 h +/− 10 min | a, c, e, f | a) for variants 1 and 2 50 ml deionized water is added to the 1-liter testing cup and 150 ml deionized water is added to the 3-liter testing cup
b) the specimen(s) is/are placed in a manner avoiding direct contact with water
c) the testing cup is tightly closed stored in the preheated heat chamber
d) for variants 1 and 2 the testing takes place immediately after removal of the testing cup from the heat chamber.
e) for variant 3 the testing cup must be cooled down to a temperature of 60 +/− 5° C. after removal from the heat chamber before being tested; after testing by three testers the testing cup must be stored for 30 minutes at 80 −/− 2° C. in the heat chamber before further testing is carried out
f) the rating must be carried out by at least three testers; differ the individual ratings of the testers in the grading by two points, a repetition of the testing by at least five testers must follow Analysis The rating of smell for all variants is accomplished by the scale as given in table 3. Grades are given from 1 to 6, whereby half grades are possible.

TABLE 3

Rating of smell

| Grade | Rating |
|---|---|
| 1 | not noticeable |
| 2 | noticeable; undisturbing |
| 3 | clearly noticeable; but not yet disturbing |
| 4 | disturbing |
| 5 | severely disturbing |
| 6 | intolerable |

The result is given as an average value, rounded by half grades. The used variant is indicated with the result.

In the present application variant C/3 has been used (see tables 1 and 2)

Preparation of Examples

TABLE 4

Properties of the examples (propylene homopolymer)

|  |  | CE 1 | CE 2 | E 1 | E 2 |
|---|---|---|---|---|---|
| H-PP1 | [%] | 99.925 | 79.772 | 79.178 | 79.178 |
| AO | [%] | 0.075 | 0.228 | 0.228 | 0.228 |
| Wollastonite A | [%] | — | — | 20.000 | — |
| Wollastonite B | [%] | — | — | — | 20.000 |
| Talc | [%] | — | 20.000 | — | — |
| total content volatile [VDA 277] | [µgC/g] | 40 | 143 | 34 | 34 |
| 2-methyl-1-propene [VDA 277] | [µgC/g] | 0.01 | 72.5 | 0.4 | 0.5 |

TABLE 4-continued

Properties of the examples (propylene homopolymer)

|  |  | CE 1 | CE 2 | E 1 | E 2 |
|---|---|---|---|---|---|
| Tcryst | [° C.] | 119 | 128 | 124 | 124 |
| Tensile Modulus | [MPa] | 1690 | 3550 | 2710 | 4360 |
| Flexural Modulus | [MPa] | 1520 | 3480 | 2530 | 3950 |

H-PP1: propylene homopolymer, namely the commercial product HD120MO of Borealis (MFR$_2$ of 8 g/10 min; xylene soluble content of 1.2 wt.-%)
AO: phenolic antioxidant, namely pentaerythrityl-tetrakis(3-(3',5'-di-tert. butyl-4-hydroxyphenyl)-propionate (CAS no 6683-19-8) [IRGANOX 1010]
Wollastonite A the commercial Wollastonite "NYAD 400" of NYCO
Wollastonite B the commercial Wollastonite "NYGLOS 8" of NYCO
Talc the commercial talc Jetfine 3CA of Luzenac Europe, France

TABLE 5

Properties of the examples (heterophasic polypropylene)

|  |  | IE 3 |
|---|---|---|
| H-PP2 | [wt %] | 35 |
| H-PP3 | [wt %] | 33 |
| HDPE | [wt %] | 10 |
| Talc | [wt %] |  |
| Wollastonite B | [wt %] | 17 |
| AO 1 | [wt %] | 0.20 |
| AO 2 | [wt %] | 0.10 |
| HALS 1 | [wt %] | 0.09 |
| HALS 2 | [wt %] | 0.09 |
| SA 1 | [wt %] | 0.20 |
| CMB 1049 | [wt %] | 4 |
| Imat Tester 1 |  | 3 |
| Imat Tester 2 |  | 4 |
| Imat Tester 3 |  | 3.5 |
| Imat Tester 4 |  | 3 |
| Odour IMAT 1 | [1-6] | 3.4 |
| MFR | [g/10 min] | 13 |
| Tensile Modulus | [MPa] | 2497.9 |
| Tensile Stress @ yield | [MPa] | 23.5 |
| Tensile Strain @ yield | [%] | 5 |
| Tensile Stress @ break | [MPa] | 9.6 |
| Tensile Strain @ break | [%] | 26.21 |
| total content volatile [VDA 277] | [µgC/g] | 20 |
| 2-methyl-1-propene [VDA 277] | [µgC/g] | <1.0 |

H-PP2 is the commercial product EF015AE of Borealis AG having melt flow rate MFR$_2$ (230° C.) of 18 g/10 min, a XCS of 29 wt.-%, and an ethylene content (C2) of 20 wt
H-PP3 is the commercial product BE677MO of Borealis AG having melt flow rate MFR$_2$ (230° C.) of 14 g/10 min, a XCS of 14 wt.-%, and an ethylene content (C2) of 7.5 wt
HDPE is the commercial product MG9641 of Borealis having melt flow rate MFR$_2$ (190° C.) of 8 g/10 min (ISO 1133) and a density 964 kg/m$^3$ (ISO 1183)
Talc the commercial talc Jetfine 3CA of Luzenac Europe, France
Wollastonite B the commercial Wollastonite "NYGLOS 8" of NYCO
AO 1 phenolic antioxidant, namely pentaerythrityl-tetrakis(3-(3',5'-di-tert. butyl-4-hydroxyphenyl)-propionate (CAS no 6683-19-8) [IRGANOX 1010 of Ciba]
AO 2 phosphorous antioxidant, namely Tris (2,4-di-t-butylphenyl) phosphite (CAS-no 31570-04-4) [Irgafos 168 of Ciba]
HALS 1 hindered amine light stabilizer, namely bis-(2,2,6,6-tetramethyl-4-piperidyl)-sebacate (CAS-no 52829-07-9) [Tinuvin 770 of Ciba]
HALS 2 hindered amine light stabilizer, namely 1,3,5-triazine-2,4,6-triamine. N,N'''-(1,2-ethane-diylbis(((4,6-bis(butyl(1,2,2,6,6-pentamethyl-4-piperidinyl)amino)-1,3,5-triazine-2-yl)imino)-3,1-propanediyl))-bis-(N',N''-dibutyl-N',N''-bis-(1,2,2,6,6-pentamethyl-piperidinyl) (CAS-no 106990-43-6) [Chimassorb 119 of Ciba]
SA 1 slip agent, namely oleamide (CAS-no 301-02-0) [Atmer SA 1758 FD of Croda Polymers]
CMB 1049 is a blended beige colour masterbatch consisting of 20 wt.-% BD310MO (heterophasic polypropylene having a MFR$_2$ (230° C.) of 8 g/10 min and a XCS of 12 wt.-% of Borealis), 58.6 wt.-% Plaswite LL 7014 (white-masterbatch with TiO$_2$ from Cabot, Belgium), 20.3 wt.-% Lifocolor Braun APE 60 (masterbatch from Lifocolor, Germany), 0.5 wt.-% Remafin Braun FRAE 30 (Clariant, Germany) and 0.5 wt.-% Plasblak PE 4103 (Carcon Black masterbatch from Cabot, Belgium); components are mixed in a co-rotating twin screw extruder at 200 to 220° C. resulting in an overall MFR$_2$ (230° C.) of 20 g/10 min

The invention claimed is:

1. A polymer composition comprising:
   inosilicate, polypropylene, and phenolic antioxidant(s), wherein headspace emission measured according to VDA 277
   (a) of all volatiles together of said polymer composition is equal to or below 120 μgC/g
   and/or
   (b) of 2-methyl-1-propene of said polymer composition is not more than 70 μgC/g.

2. The polymer composition according to claim 1, wherein the inosilicate is a single chain inosilicate.

3. The polymer composition according to claim 1, wherein the inosilicate is from the pyroxenoid group.

4. The polymer composition according to claim 1, wherein the inosilicate is wollastonite ($Ca_3[Si_3O_9]$).

5. The polymer composition according to claim 1, wherein the polymer composition comprises additionally (a) phosphorous antioxidant(s).

6. The polymer composition according to claim 1, wherein the polymer composition comprises:
   (a) at least 50 wt. % polypropylene
   (b) 1,000 to 550,000 ppm inosilicate,
   (c) 100 to 5,000 ppm of phenolic antioxidants, and
   (d) optionally 100 to 5,000 ppm of phosphorous antioxidants based on the polymer composition.

7. The polymer composition according to claim 1, wherein the polymer composition does not comprise talc.

8. The polymer composition according to claim 1, wherein the polypropylene is a heterophasic propylene copolymer comprising a polypropylene matrix and an amorphous elastomer.

9. The polymer composition according to claim 1, wherein the phenolic antioxidant(s) is/are (a) sterically hindered phenolic antioxidant(s).

10. The polymer composition according to claim 1, wherein the phenolic antioxidant(s) comprise(s) at least one residue of formula (II):

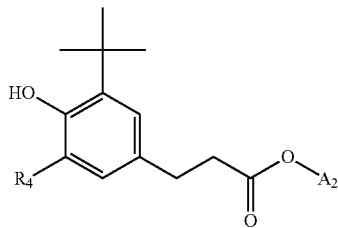

wherein $R_4$ is $(CH_3)_3C-$, $CH_3-$, or H, and
$A_2$ constitutes the remaining part of the phenolic antioxidant(s).

11. The polymer composition according to claim 1, wherein the polymer composition comprises additionally:
   (a) polyethers having a weight average molecular weight (Mw) of more than 300 g/mol,
   and/or
   (b) carbonyl compounds selected from the group consisting of carboxylic acid, carboxylic acid amide and carboxylic acid ester.

12. The polymer composition according to claim 6, wherein the inosilicate is a single chain inosilicate.

13. The polymer composition according to claim 6, wherein the inosilicate is from the pyroxenoid group.

14. The polymer composition according to claim 6, wherein the inosilicate is wollastonite ($Ca_3[Si_3O_9]$).

15. The polymer composition according to claim 6, wherein the polymer composition does not comprise talc.

16. The polymer composition according to claim 6, wherein the polypropylene is a heterophasic propylene copolymer comprising a polypropylene matrix and an amorphous elastomer.

17. The polymer composition according to claim 6, wherein the phenolic antioxidant(s) is/are (a) sterically hindered phenolic antioxidant(s).

18. The polymer composition according to claim 6, wherein the phenolic antioxidant(s) comprise(s) at least one residue of formula (II):

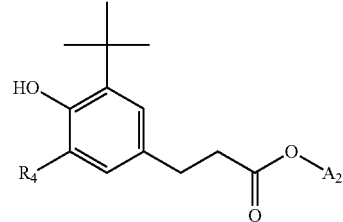

wherein $R_4$ is $(CH_3)_3C-$, $CH_3-$, or H, and
$A_2$ constitutes the remaining part of the phenolic antioxidant(s).

19. The polymer composition according to claim 6, further comprising:
   (a) polyethers having a weight average molecular weight (Mw) of more than 300 g/mol,
   and/or
   (b) carbonyl compounds selected from the group consisting of carboxylic acid, carboxylic acid amide and carboxylic acid ester.

* * * * *